(12) United States Patent
Dètrembleur et al.

(10) Patent No.: US 7,381,785 B2
(45) Date of Patent: *Jun. 3, 2008

(54) PREPARATION OF NEW RADIATION-CURING BINDERS

(75) Inventors: Christophe Dètrembleur, Liège (BE); Jan Weikard, Odenthal (DE); Dorota Greszta-Franz, Erkrath (DE); Wolfgang Fischer, Meerbusch (DE); Jörg Schmitz, Köln (DE); Holger Mundstock, Wermelskirchen (DE)

(73) Assignee: Bayer MeterialScience AG, Leverkusen (DE)

( * ) Notice: Subject to any disclaimer, the term of this patent is extended or adjusted under 35 U.S.C. 154(b) by 465 days.

This patent is subject to a terminal disclaimer.

(21) Appl. No.: 11/080,176

(22) Filed: Mar. 14, 2005

(65) Prior Publication Data

US 2005/0209361 A1    Sep. 22, 2005

(30) Foreign Application Priority Data

Mar. 17, 2004    (DE) .................. 10 2004 012 902

(51) Int. Cl.
*C08G 18/78*    (2006.01)
*C08G 18/67*    (2006.01)
*C08G 18/16*    (2006.01)
*C09D 175/16*    (2006.01)

(52) U.S. Cl. .................... 528/48; 528/57; 528/65; 522/90; 522/97

(58) Field of Classification Search ............... 528/48, 528/65, 57; 522/90, 97
See application file for complete search history.

(56) References Cited

U.S. PATENT DOCUMENTS

| | | | |
|---|---|---|---|
| 4,108,814 A | 8/1978 | Reiff et al. ............ 260/29.2 TN |
| 4,160,080 A | 7/1979 | Köenig et al. ................ 528/59 |
| 4,542,165 A * | 9/1985 | Kumata et al. ............. 521/137 |
| 4,717,738 A * | 1/1988 | Fukuda et al. ............. 521/137 |
| 5,672,736 A | 9/1997 | Brahm et al. .............. 560/345 |
| 5,777,024 A | 7/1998 | Killilea et al. .............. 524/590 |
| 5,917,083 A | 6/1999 | König et al. ................ 560/157 |
| 6,150,476 A | 11/2000 | Dvorchak et al. .......... 525/455 |
| 6,191,181 B1 * | 2/2001 | Weikard et al. ............. 522/174 |
| 6,392,001 B1 | 5/2002 | Mertes et al. ................ 528/59 |
| 6,617,413 B1 | 9/2003 | Bruchmann et al. ......... 528/75 |
| 7,135,505 B2 * | 11/2006 | Roesler et al. ............. 522/96 |
| 2003/0153713 A1 | 8/2003 | Spyrou et al. ................ 528/48 |
| 2004/0138389 A1 | 7/2004 | Baumgart et al. .......... 525/452 |
| 2005/0096450 A1 * | 5/2005 | Spyrou et al. ................ 528/44 |
| 2005/0209361 A1 * | 9/2005 | Detrembleur et al. ....... 522/183 |

FOREIGN PATENT DOCUMENTS

CA    2253119    5/1999
EP    0 649 866 A1    4/1995
GB    994 890    6/1965

OTHER PUBLICATIONS

Macromol Symp., 187, (month unavailable) 2000, pp. 531-542, T. Jung, A. Valet, "Scratch Resistance and Weatherfastness of UV-Curable Clearcoats".
Proceedings of the International Waterborne, High-Solids, and Powder Coating Symposium, Feb. 21-23, 2001, pp. 405-419, Michaela Gedan-Smolka et al, "New Catalysts for the Low Temperature Curing of Uretdione Powder Coatings".
Angew. Makromol. Chem., 171, (month unavailable) 1989, pp. 21-38, Felix Schmitt, "Isocyanatfreie, zwelkomponentige Polyurethansysteme".
Proceedings of the International Waterborne, High-Solids, and Powder Coatings Symposium, Feb. 21-23, 2001, pp. 77-89, K.B. Chandalia et al, "New Non-Isocyanate Curatives for 2K Solvent-Borne Urethane Coatings".
J. Prakt, Chem., 336, (month unavailable) 1994, pp. 185-200, Hans Josef Laas et al, "Zur Synthese aliphatischer Polyisocyanate—Lackpolyisocyanate mit Biuret-, Isocyanurat-oder Uretdionstruktur".
Progress in Organic Coatings 36, (month unavailable) 1999, pp. 148-172, Dougas A. Wicks et al, "Blocked isocyanates III: Part A. Mechanisms and chemistry".
Ullmanns Encyclopädie der technischen Chemie, $4^{th}$ edition, vol. 19, (month unavailable) 1980, pp. 31-38, Dr. Dieter Maassen et al, "Polyalkylenglykole".
Chemistry & Technology of UV & EB Formulations for Coatings, Inks & Paints, vol. 2, (month unavailable) 1991, SITA Technology, pp. 237-285, N.S. Allen et al, "Reactive Diluents for UV and EB Curable Formulations".
Römpp Lexikon Chemie, $10^{th}$ ed., (month unavailable) 1998, Georg-Thieme-Verlag, Stuttgart, pp. 491-492, Dr. Ulrich Zorll.

* cited by examiner

Primary Examiner—Susan W. Berman
(74) Attorney, Agent, or Firm—Noland J. Cheung; Robert S. Klemz

(57) ABSTRACT

Process for preparing binders including reacting A) one or more NCO-functional compounds containing uretdione groups with B) one or more compounds containing groups capable of participating in polymerization reaction with ethylenically unsaturated compounds on exposure to actinic radiation, and contain isocyanate-reactive groups, followed by C) reaction with one or more hydroxyl-containing compounds other than B), wherein at least one of these compounds has an OH functionality of $\geq 2$, D) in the presence of one or more compounds containing phenoxide groups, as catalysts, and E) optionally auxiliaries and additives, where the reaction with compounds of component C) proceeds at least proportionally with the formation of allophanate groups and where and including binders containing allophanate groups and groups capable of participating in a polymerization reaction with ethylenically unsaturated compounds on exposure to actinic radiation, and optionally also contain NCO-reactive groups. The binders are used in coating compositions used to coat substrates.

13 Claims, No Drawings

PREPARATION OF NEW RADIATION-CURING BINDERS

CROSS REFERENCE TO RELATED PATENT APPLICATION

The present patent application claims the right of priority under 35 U.S.C. §119 (a)-(d) of German Patent Application No. 10 2004 012 902.9, filed Mar. 17, 2004.

BACKGROUND OF THE INVENTION

1. Field of the Invention

The present invention relates to a process for preparing innovative binders which contain groups which react, with polymerization, with ethylenically unsaturated compounds on exposure to actinic radiation, and optionally also contain groups which are reactive towards isocyanates, and also to their use in coating compositions.

2. Description of the Prior Art

The curing of coating systems which carry activated double bonds by actinic radiation, such as UV light, IR radiation or else electron beams, is known and is established in industry. It is one of the most rapid curing methods in coating technology.

Particularly advantageous properties can be obtained if radiation curing is combined with an independently controllable second crosslinking step. Coating systems of that kind are referred to as dual-cure systems (e.g. Macromal. Symp. 187, 531-542, 2002).

Because of the environmental and economic requirements imposed on modern coating systems, that they should use as little organic solvents as possible, or none at all, for adjusting the viscosity, there is a desire to use coatings raw materials which are already of low viscosity. Known for this purpose for a long time have been polyisocyanates with an allophanate structure as are described, inter alia, in EP-A 0 682 012.

In industry these substances are prepared by reacting a monohydric or polyhydric alcohol with excess aliphatic and/or cycloaliphatic diisocyanate (cf. GB-A 994 890, EP-A 0 000 194 or EP-A 0 712 840). This is followed by removal of unreacted diisocyanate by means of distillation under reduced pressure. According to DE-A 198 60 041 this procedure can also be carried out with OH-functional compounds having activated double bonds, such as hydroxyalkyl acrylates, although difficulties occur in relation to the preparation of particularly low-monomer products. Since the distillation step has to take place at temperatures up to 135° C., in order to be able to lower the residue isocyanate content sufficiently (<0.5% by weight of residue monomer), it is possible for double bonds to react, with polymerization, under thermal initiation, even during the purification process, meaning that ideal products are no longer obtained.

EP-A 0 825 211 describes a process for synthesizing allophanate structures from oxadiazinetriones, although no radiation-curing derivatives having activated double bonds are known. All that is mentioned is the use of maleate- and/or fumarate-containing polyesters; the possibility of radiation curing is not described.

U.S. Pat. No. 5,777,024 describes the preparation of low-viscosity radiation-curing allophanates by reacting hydroxy-functional monomers which carry activated double bonds with NCO-containing allophanate-modified isocyanurates.

The formation of allophanate compounds by ring opening of uretdiones with alcohols is known as a crosslinking mechanism in powder coating materials (cf. Proceedings of the International Waterborne, High-Solids, and Powder Coatings Symposium 2001, 28th, 405-419, and also U.S. Pat. No. 2003 0153 713). Nevertheless, the reaction temperatures required for this purpose are too high ($\geq 120°$ C.) for the targeted preparation of radiation-curing monomers based on allophanate with activated double bonds.

Historically the direct reaction of uretdione rings with alcohols to allophanates was first investigated for solvent-borne, isocyanate-free, 2 K [2-component] polyurethane coating materials. Without catalysis this reaction is of no technical importance, owing to the low reaction rate (F. Schmitt, Angew. Makromol. Chem. (1989), 171, pp. 21-38). With appropriate catalysts, however, the crosslinking reaction between hexamethylene diisocyanate (HDI)-based uretdione curatives and polyols is said to begin at 60-80° C. (K. B. Chandalia; R. A Englebach; S. L. Goldstein; R. W. Good; S. H. Harris; M. J. Morgan; P. J. Whitman; R. T. Wojcik, Proceedings of the International Waterborne, High-Solids, and Powder Coatings Symposium, (2001), pp. 77-89). The structure of these catalysts has not been published to date. Commercial products prepared by utilizing this reaction are also undisclosed to date.

In summary it may be stated that the preparation of low-viscosity radiation-curing allophanates by ring-opening reaction of alcohols with uretdiones at temperatures below 100° C. is unknown from the prior art.

SUMMARY OF THE INVENTION

The present invention provides a process for preparing binders comprising reacting
A) one or more NCO-functional compounds containing uretdione groups first with
B) one or more compounds which contain groups capable of participating in polymerization reaction with ethylenically unsaturated compounds on exposure to actinic radiation, and contain isocyanate-reactive groups, followed by
C) reaction with one or more hydroxyl-containing compounds other than B), wherein at least one of these compounds has an OH functionality of $\geq 2$,
D) in the presence of one or more compounds containing phenoxide groups, as catalysts, and
E) optionally auxiliaries and additives, where the reaction with compounds of component C) proceeds at least proportionally with the formation of allophanate groups and where and including binders containing allophanate groups and groups capable of participating in a polymerization reaction with ethylenically unsaturated compounds on exposure to actinic radiation, and optionally also contain NCO-reactive groups.

The present invention also provides coating compositions that include
a) one or more of the above-described binders containing allophanate groups,
b) optionally one or more polyisocyanates containing free or blocked isocyanate groups, which optionally contain groups capable of participating in a polymerization reaction with ethylenically unsaturated compounds on exposure to actinic radiation,
c) optionally other compounds, different from those of a), which contain groups capable of participating in a polymerization reaction with ethylenically unsaturated compounds on exposure to actinic radiation, and optionally contain NCO-reactive groups, d) optionally one or more isocyanate-reactive compounds containing active hydrogen which are free from groups capable of participating in a polymerization reaction with ethylenically unsaturated compounds on exposure to actinic radiation,
e) initiators,
f) optionally auxiliaries and additives.

The present invention additionally provides substrates coated with coatings obtained from binders containing allophanate groups as described above.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

It was an object of the present invention to provide a process for preparing low-viscosity allophanates which contain actinically curable groups and, advantageously, isocyanate-reactive groups as well and are therefore suitable as crosslinkers for dual-cure applications; on the basis of their allophanate structure these compounds ought to have lower viscosities than corresponding compounds containing only urethane structures. Moreover, temperatures of below 100° C. ought to be sufficient for their preparation and/or after treatment.

It has now been found that by reacting uretdione- and NCO-functional compounds with alcohols containing actinically curable double bonds and with polyhydroxy compounds, using phenoxide salts as catalysts, binders are obtained which can contain actinically curable and optionally also NCO-reactive groups and which meet the stated requirements.

For the purposes of the present inventions the terms "radiation-curing groups", "actinically curing groups" and "groups which react, with polymerization, with ethylenically unsaturated compounds on exposure to actinic radiation" are used synonymously.

Groups which react, with polymerization, with ethylenically unsaturated compounds on exposure to actinic radiation are, for example, vinyl, vinyl ether, propenyl, allyl, maleyl, fumaryl, maleimide, dicyclopentadienyl, acrylamide, acrylic and methacrylic groups, preference being given to employing activated groups of this kind such as vinyl ether, acrylate and/or methacrylate groups, more preferably acrylate groups, in the compounds of component B).

By NCO-reactive groups are meant OH—, SH— and NH-functional compounds, particularly hydroxyl groups, primary and/or secondary amino groups, and/or aspartate groups. Preference is given to hydroxyl groups.

The invention accordingly provides a process for preparing binders containing allophanate groups which contain groups which react, with polymerization, with ethylenically unsaturated compounds on exposure to actinic radiation, and optionally also contain NCO-reactive groups, where one or more NCO-functional compounds containing uretdione groups is or are reacted first with one or more compounds which contain groups which react, with polymerization, with ethylenically unsaturated compounds on exposure to actinic radiation, and contain isocyanate-reactive groups, and then reaction takes place with one or more hydroxyl-containing compounds other than B), at least one of these compounds having an OH functionality of $\geq 2$, in the presence of one or more compounds containing phenoxide groups, as catalysts, and optionally auxiliaries and additives, the reaction with compounds of component C) proceeding at least proportionally with formation of allophanate groups.

Additionally the binders obtainable by the process of the invention are provided by the invention.

In component A) it is possible to use all organic compounds which contain at least one uretdione and one NCO group.

Preferably the compounds used in A) have a uretdione group content (calculated as $C_2N_2O_2$=84 g/mol) of from 3% to 60%, more preferably from 10% to 50% and in particular from 25% to 40% by weight.

Preferably the compounds used in A), at the same time as having the above mentioned uretdione group content, also have an NCO group content (calculated as NCO=42 g/mol) of from 3% to 60%, more preferably from 10% to 50% and in particular from 15% to 25% by weight.

Compounds of this kind are usually prepared by catalytic dimerization of aliphatic, cycloaliphatic, aromatic and/or araliphatic diisocyanates or polyisocyanates by methods which are known per se (cf. J. Prakt. Chem. 1994, 336, page 196-198).

Examples of suitable diisocyanates include 1,4-diisocyanatobutane, 1,6-diisocyanatohexane, trimethylhexane diisocyanate, 1,3- and 1,4-bisisocyanatomethylcyclohexane, isophorone diisocyanate (IPDI), 4,4'-diisocyanatodicyclohexylmethanes, 1,3- and 1,4-xylylene diisocyanates (XDI commercial product from Takeda, Japan), diphenylmethane 4,4'-diisocyanate and diphenylmethane 2,4'-diisocyanate (MDI), 2,4- and 2,6-toluene diisocyanate (TDI), or mixtures thereof. For the purposes of the invention it is preferred to use 1,6-diisocyanatohexane, isophorone diisocyanate and/or mixtures thereof.

Examples of catalysts employed in this context include the following: trialkylphosphines, dimethylaminopyridines, tris(dimethylamino)phosphine. The result of the dimerization reaction depends, in a manner known to the skilled person, on the catalyst used, on the process conditions and on the diisocyanates employed. In particular it is possible for products to be formed which contain on average more than one uretdione group per molecule, the number of uretdione groups being subject to a distribution. Depending on the catalyst used, the process conditions and the diisocyanates employed, product mixtures are also formed which in addition to uretdiones also contain other structural units, such as isocyanurate and/or iminooxadiazinedione, for example.

Particularly preferred compounds of component A) comprise products of the catalytic dimerization of HDI, have a free HDI content of less than 0.5% by weight, an NCO content of 17-25% by weight, in particular of 21-24% by weight, and a viscosity at 23° C. of from 20 to 500 mPas, in particular from 50 to 200 mPas.

The NCO-functional compounds obtainable by catalytic dimerization are preferably used directly in component A); alternatively some of the isocyanate groups can also be reacted further initially, and the resulting product then used in A). This further reaction may be, for example, blocking of some of the free NCO groups or further reaction of NCO groups with NCO-reactive compounds which are known in isocyanate chemistry and are described, inter alia, by way of example in J. Prakt. Chem. 1994, 336, page 185 to form iminooxadiazinedione, isocyanurate, uretdione, urethane, allophanate, biuret urea, oxadiazinetrione, oxazolidinone, acylurea or carbodiimide structures. This gives compounds containing uretdione groups of increased molecular weight which, depending on the chosen proportions, contain different amounts of NCO groups.

Blocking agents suitable for example are alcohols, lactams, oximes, malonates, alkyl acetoacetates, triazoles, phenols, imidazoles, pyrazoles and amines, such as butanone oxime, diisopropylamine, 1,2,4-triazole, dimethyl-1,2,4-triazole, imidazole, diethyl malonate, ethyl acetoacetate, acetone oxime, 3,5-dimethylpyrazole, ε-caprolactam, N-tert-butylbenzylamine, cyclopentanone carboxyethyl ester or any desired mixtures of these blocking agents. The procedure for the blocking of NCO groups is well known to the skilled worker and described exemplarily in Progress in Organic Coatings 1999, 36, 148-172.

By way of example the NCO groups can also be used partly with compounds which have a hydrophilicizing action and contain at least one isocyanate-reactive group, individually or as a mixture. Compounds with a hydrophilicizing action are used in particular when the process product of the invention is to be dispersed or dissolved in water or water-containing mixtures.

By compounds with a hydrophilicizing action are meant all ionically, potentially ionically and non-ionically hydrophilicizing compounds containing at least one isocyanate-reactive group. As isocyanate-reactive groups these compounds contain preferably hydroxy and/or amino functions.

As ionically or potentially ionically hydrophilicizing compounds of component C) it is preferred to use compounds which contain at least one isocyanate-reactive group and also at least one functionality, such as, for example, —COOY, —$SO_3$Y, —PO(OY)$_2$ (Y=H, $NH_4^+$, metal cation), —$NR_2$, —$NR_3^+$, —$PR_3^+$ (R=H, alkyl, aryl). By potentially ionically hydrophilicizing compounds are meant those which on interaction with aqueous media enter into an optionally pH-dependent dissociation equilibrium and in that way are negatively, positively or neutrally charged.

Examples of suitable ionically or potentially ionically hydrophilicizing compounds are mono- and dihydroxycarboxylic acids, mono- and diaminocarboxylic acids, mono- and dihydroxysulphonic acids, mono- and diaminosulphonic acids and also mono- and dihydroxyphosphonic acids or mono- and diaminophosphonic acids and their salts, such as dimethylol propionic acid, dimethyl-olbutyric acid, hydroxypivalic acid, N-(2-aminoethyl)-β-alanine, 2-(2-aminoethylamino)ethanesulphonic acid, ethylenediamine-propyl- or butylsulphonic acid, 1,2- or 1,3-propylenediamine-β-ethylsulphonic acid, malic acid, citric acid, glycolic acid, lactic acid, glycine, alanine, taurine, lysine, 3,5-diaminobenzoic acid, an adduct of IPDI and acrylic acid (EP-A 0 916 647, Example 1) and its alkali metal and/or ammonium salts; the adduct of sodium bisulphite with but-2-ene-1,4-diol, polyethersulphonate, the propoxylated adduct of 2-butenediol and NaHSO$_3$, described for example in DE-A 2 446 440 (page 5-9, formula I-II) and also structural units which can be converted into cationic groups, such as N-methyldiethanolamine, as hydrophilic synthesis components.

Preferred ionically or potential ionically hydrophilicizing compounds are those possessing carboxyl or carboxylate and/or sulphonate groups and/or ammonium groups. Particularly preferred ionic compounds are those which contain carboxyl and/or sulphonate groups as ionic or potentially ionic groups, such as the salts of N-(2-aminoethyl)-β-alanine, of 2-(2-aminoethylamino)ethanesulphonic acid or of the adduct of IPDI and acrylic acid (EP-A 0 916 647, Example 1) and also of dimethylolpropionic acid.

As hydrophilic nonionic compounds it is possible to use compounds with a polyether structure, preferably alkylene oxide-based polyethers which contain at least one hydroxyl or amino group as isocyanate-reactive group. These compounds with a polyether structure may be, for example, monofunctional polyalkylene oxide polyether alcohols with at least 30 mol % of ethylene oxide, containing on average from 5 to 70, preferably from 7 to 55, ethylene oxide units per molecule, such as are obtainable in conventional manner by alkoxylating suitable starter molecules (e.g. in Ullmanns Encyclopädie der technischen Chemie, 4th edition, volume 19, Verlag Chemie, Weinheim pp. 31-38).

Examples of suitable starter molecules are saturated monoalcohols such as methanol, ethanol, n-propanol, isopropanol, n-butanol, isobutanol, sec-butanol, the isomers pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers such as, for example, diethylene glycol monobutyl ether, unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol, secondary monoamines such as dimethylamine, diethylamine, dipropylamine, diisopropylamine, dibutylamine, bis(2-ethylhexyl)amine, N-methyl- and N-ethylcyclohexylamine or dicyclohexylamine and also heterocyclic secondary amines such as morpholine, pyrrolidine, piperidine or 1H-pyrazole. Preferred starter molecules are saturated monoalcohols. Particular preference is given to using diethylene glycol monobutyl ether as starter molecule.

Alkylene oxides suitable for the alkoxylation reaction are, in particular, ethylene oxide and propylene oxide, which can be used in any order, separately from one another or in a mixture, in the alkoxylation reaction, so that block polyethers or copolyethers are obtained.

Preferably the compounds with a polyether structure are simple polyethylene oxide polyethers or mixed polyalkylene oxide polyethers at least 30 mol %, preferably at least 40 mol %, of whose alkylene oxide units consist of ethylene oxide units.

Very particular preference is given to monofunctional mixed polyalkylene oxide polyethers which contain at least 40 mol % of ethylene oxide units and not more than 60 mol % of propylene oxide units.

Especially when using a hydrophilicizing agent containing ionic groups it is necessary to investigate its effect on the action of the catalyst D). For this reason preference is given to nonionic hydrophilicizing agents.

Compounds of component B) that are suitable by way of example, and which can be used alone or in a mixture, are 2-hydroxyethyl(meth)acrylate, polyethylene oxide mono (meth)acrylate (e.g. PEA6/PEM6; Laporte Performance Chemicals Ltd., UK), polypropylene oxide mono(meth) acrylate (e.g. PPA6, PPM5S; Laporte Performance Chemicals Ltd., UK), polyalkylene oxide mono(meth)acrylate (e.g. PEM63P, Laporte Performance Chemicals Ltd., UK), poly (ε-caprolactone) mono(meth)acrylates (e.g. Tone M100® Dow, Schwalbach, D E), 2-hydroxypropyl (meth)acrylate, 4-hydroxybutyl(meth)acrylate, 3-hydroxy-2,2-dimethylpropyl (meth)acrylate, the hydroxy-functional mono-, di- or where possible higher acrylates such as, for example, glyceryl di(meth)acrylate, trimethylolpropane di(meth)acrylate, pentaerythritol tri(meth)acrylate or dipentaerythritol penta (meth)acrylate, which are obtainable by reacting polyhydric, optionally alkoxylated alcohols such as trimethylolpropane, glycerol, pentaerythritol, dipentaerythritol optionally as a mixture obtained industrially.

Likewise suitable as a constituent of B) as well are alcohols obtained from the reaction of acids containing double bonds with epoxide compounds optionally containing double bonds, such as, for example, the reaction products of (meth)acrylic acid with glycidyl(meth)acrylate or bisphenol A diglycidyl ether. Additionally it is likewise possible to use unsaturated alcohols which are obtained from the reaction of optionally unsaturated acid anhydrides with hydroxy compounds and epoxide compounds that optionally contain acrylate groups. By way of example these are the reaction products of maleic anhydride with 2-hydroxyethyl (meth)acrylate and glycidyl(meth)acrylate.

Particularly preferred compounds of B) are 2-hydroxyethyl acrylate, 2-hydroxypropyl acrylate, 4-hydroxybutyl acrylate, Tone M100® (Dow, Schwalbach, D E), polyethylene oxide mono(meth)acrylate (e.g. PEA6/PEM6; Laporte Performance Chemicals Ltd., UK), polypropylene oxide mono(meth)acrylate (e.g. PPA6, PPM5S; Laporte Performance Chemicals Ltd., UK) and also the reaction products of acrylic acid with glycidyl methacrylate.

Component C) comprises one or more hydroxyl-containing compounds other than B), at least one compound having a functionality of this kind of $\geq 2$. The compounds may be monomeric and/or polymeric.

Examples of suitable low molecular mass monools, diols or polyols are short-chain—that is, containing 2 to 20 carbon atoms—aliphatic, araliphatic or cycloaliphatic monoalcohols, diols or polyols. Examples of monoalcohols are methanol, ethanol, the isomeric propanols, butanols, pentanols, and also diacetone alcohol, fatty alcohols or fluorinated alcohols such as are obtainable for example under the name Zonyl® from DuPont. Examples of diols are ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, positionally isomeric diethyloctanediols, 1,3-butylene glycol, cyclohexanediol, 1,4-cyclohexanedimethanol, 1,6-hexanediol, 1,2- and 1,4-cyclohexanediol, hydrogenated bisphenol A (2,2-bis(4-hydroxycyclohexyl)propane), 2,2-dimethyl-3-hydroxypropyl 2,2-dimethyl-3-hydroxypropionate. Examples of suitable triols are trimethylolethane, trimethylolpropane or glycerol. Examples of suitable polyols are ditrimethylolpropane, pentaerythritol, dipentaerythritol and sorbitol. Preference is given to the alcohols 1,4-butanediol, 1,4-cyclohexanedimethanol, 1,6-hexanediol and trimethylolpropane.

Also suitable are higher molecular mass polyols such as polyester polyols, polyether polyols, hydroxy-functional (meth)acrylate (co)polymers, hydroxy-functional polyurethanes or corresponding hybrids (cf. Römpp Lexikon Chemie, pp. 465-466, 10th ed. 1998, Georg-Thieme-Verlag, Stuttgart).

In the preparation of the hydroxy-functional polyesters it is possible in particular for 6 groups of monomer constituents to be employed:

(Cyclo)alkanediols such as dihydric alcohols having (cyclo)aliphatically attached hydroxyl groups, such as the compounds already mentioned above as low molecular mass diols, and also polyethylene, polypropylene or polybutylene glycols having a molecular weight $M_n$ of 200 to 4000 g/mol, preferably 300 to 2000 g/mol, more preferably 450 to 1200 g/mol. Reaction products of the aforementioned diols with ε-caprolactone or other lactones may likewise be employed as diols.

Alcohols with a hydricity of 3 or more and a molecular weight $M_n$ of 92 to 254 g/mol, such as glycerol, trimethylolpropane, pentaerythritol, dipentaerythritol and sorbitol, polyethers prepared starting from these alcohols, such as the reaction product of 1 mol of trimethylolpropane with 4 mol of ethylene oxide, or alcohols obtained by reaction with ε-caprolactone or other lactones.

Monoalcohols such as ethanol, 1- and 2-propanol, 1- and 2-butanol, 1-hexanol, 2-ethylhexanol, cyclohexanol and benzyl alcohol.

Dicarboxylic acids with a molecular weight $M_n$ of 104 to 600 g/mol and/or their anhydrides, such as phthalic acid, phthalic anhydride, isophthalic acid, tetrahydrophthalic acid, tetrahydrophthalic anhydride, hexahydrophthalic acid, hexahydrophthalic anhydride, cyclohexanedicarboxylic acid, maleic anhydride, fumaric acid, malonic acid, succinic acid, succinic anhydride, glutaric acid, adipic acid, pimelic acid, suberic acid, sebacic acid, dodecanedioic acid, hydrogenated dimer fatty acids.

Relatively high-functionality carboxylic acids and/or their anhydrides such as, for example, trimellitic acid and trimellitic anhydride.

Monocarboxylic acids, such as benzoic acid, cyclohexanecarboxylic acid, 2-ethylhexanoic acid, caproic acid, caprylic acid, capric acid, lauric acid, natural and synthetic fatty acids.

Suitable hydroxyl-containing polyesters comprise the reaction product of at least one constituent from group 1 or 2 with at least one constituent from group 4 or 5. Alternatively it is also possible to use the above-described reaction products of alcohols with lactones. The hydroxyl-containing polyesters have number-average molecular weights $M_n$ of 500 to 10 000 g/mol, preferably 800 to 3000 g/mol, and a hydroxyl group content of from 1% to 20%, preferably from 3% to 15% by weight. The polyesters can be employed as they are or in solution in reactive diluents or solvents that are suitable for the process of the invention.

Suitability is possessed not only by the polyester polyols described but also by dendrimeric or hyperbranched compounds such as are obtainable for example from ethoxylated pentaerythritol and dimethylolpropionic acid.

Suitable polycarbonate polyols are, for example, obtainable by reacting the alcohols mentioned above in connection with the polyester polyols with organic carbonates such as, for example, diphenyl, dimethyl or diethyl carbonate by known methods. They customarily have number-average molecular weights of 500 to 5000 g/mol, preferably of 750 to 2500 g/mol and hydroxyl functionalities of 1.5 to 3.

Suitable polyethers are for example those, the alkylene oxide polyethers prepared starting from the abovementioned low molecular mass monools, diols or polyols. Additionally, polyethers obtainable by polymerizing tetrahydrofuran. The polyethers have number-average molecular weights $M_n$ of 400 to 13 000 g/mol, preferably 400 to 2500 g/mol, in particular 500 to 1200 g/mol and a hydroxyl group content of from 1% to 25%, preferably from 3% to 15% by weight.

(Meth)acrylate (co)polymers are described exhaustively in WO 03/000812 on pages 8 to 16 and reference is made to suitable preparation processes, suitability in accordance with the invention being possessed only by those (meth)acrylate (co)polymers which contain at least one hydroxyl group. The (meth)acrylate (co)polymers preferably have number-average molecular weights $M_n$ of 500 to 10 000 g/mol, in particular from 1000 to 5000 g/mol and a hydroxyl group content of from 1% to 20%, in particular from 3% to 15% by weight.

Particular preference is given to using in component C) one or more compounds selected from the group consisting of monomeric diols and triols, polyethers derived from them and also polylactones with an average molecular weight $M_n < 1000$ g/mol.

As compounds of catalyst component D) it is also possible, in addition to the phenoxides for use in accordance with the invention, to make use in principle of the compounds known per se to the skilled person for catalysing the reaction of isocyanate groups with isocyanate-reactive groups, individually or in any desired mixtures with one another.

Examples that may be mentioned here include tertiary amines such as triethylamine, pyridine, methylpyridine, benzyldimethylamine, N,N-endoethylenepiperazine, N-methylpiperidine, pentamethyldiethylenetriamine, N,N-dimethylaminocyclohexane, N,N'-dimethylpiperazine, 1,4-diazabicyclo[2.2.2]octane (DABCO) or metal salts such as iron (III) chloride, tin(II) octoate, tin(II) ethylcaproate, tin(II) palmitate, dibutyltin(IV) dilaurate, dibutyltin(IV) diacetate and molybdenum glycolate or any desired mixtures of such catalysts.

It is preferred, however, in D) to use exclusively phenoxides and/or compounds containing phenoxide groups as catalysts.

The compounds of component D) containing phenoxide groups preferably correspond to the general formula (I),

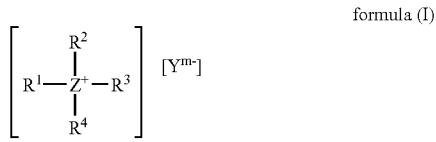

formula (I)

in which

Z is nitrogen or phosphorus, $R^1$, $R^2$, $R^3$, $R^4$ independently of one another are hydrogen or identical or different optionally unsaturated, substituent-bearing or heteroatom-containing aliphatic, cycloaliphatic or aromatic radicals having up to 24 carbon atoms and Y is a phenoxide radical of the general formula (II),

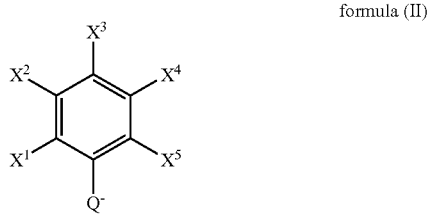

formula (II)

in which

Q is oxygen, $X^1$, $X^2$, $X^3$, $X^4$, $X^5$ independently of one another are substituents selected from the group consisting of hydrogen, halogen, cyano, hydroxyl, amide, amine, ether, ester, thioether, ketone, aldehyde and carboxylate group and also optionally unsaturated, substituent-bearing or heteroatom-containing aliphatic, cycloaliphatic or aromatic radicals having up to 24 carbon atoms, and optionally form parts of cyclic or polycyclic systems.

As compounds of formula (I) containing phenoxide groups it is particularly preferred to use ammonium phenoxides and phosphonium phenoxides and especially preferred to use tetraalkylammonium phenoxides and tetraalkylphosphonium phenoxides.

Phenoxides preferred in particular are tetrabutylammonium 4-(methoxycarbonyl)phenoxide, tetrabutylammonium 2-(methoxycarbonyl)phenoxide, tetrabutylammonium 4-formylphenoxide, tetrabutylammonium 4-nitrilephenoxide, tetrabutylphosphonium 4-(methoxycarbonyl)phenoxide, tetrabutylphosphonium 2-(methoxycarbonyl)phenoxide, tetrabutylphosphonium 4-formylphenoxide, tetrabutylammonium salicylate and/or tetrabutylphosphonium salicylate.

It is also possible to generate the aforementioned phenoxides of component D) in situ during the process. By using the corresponding phenols and strong bases such as tetrabutylammonium hydroxide or tetrabutylphosphonium hydroxide it is possible to generate the catalytically active phenoxides actually during the process.

It may be pointed out at this point that phenolic stabilizers of component E) may also react, by reaction with bases, to form phenoxides which function as catalysts for the purposes of component D). In that case it should be ensured that such phenoxides, in contrast to the corresponding phenols, no longer possess any stabilizing effect. It should also be borne in mind that strong bases such as tetrabutylammonium hydroxide or tetrabutylphosphonium hydroxide catalyse the formation of other isocyanate derivatives, especially the trimerization. It is also possible to apply the catalysts D) to support materials by methods known to the skilled person and to use them as heterogeneous catalysts.

The compounds of the catalyst component D) can be dissolved advantageously in one of the components participating in the process, or in a portion thereof. In particular the phenoxide salts for use in accordance with the invention generally dissolve well in the polar hydroxy compounds, so that D) in solution in small amounts of C) can be metered in as a concentrated solution in liquid form.

In the process of the invention the catalyst component D) is used typically in amounts of 0.001-5.0% by weight, preferably 0.01-2.0% by weight and more preferably 0.05-1.0% by weight, based on solids content of the process product. As constituents of component E) it is possible in the process of the invention to make use, for example, of solvents or reactive diluents as well.

Suitable solvents are inert towards the functional groups present in the process product from the time of their addition up to the end of the process. Suitable solvents are, for example, those used in the paint industry, such as hydrocarbons, ketones and esters, e.g. toluene, xylene, isooctane, acetone, butanone, methyl isobutyl ketone, ethyl acetate, butyl acetate, tetrahydrofuran, N-methylpyrrolidone, dimethylacetamide and dimethylformamide, though it is preferred not to add any solvent.

As reactive diluents it is possible to use compounds which in the course of UV curing are likewise (co)polymerized and hence incorporated into the polymer network. If these compounds are brought into contact already with the NCO-containing compounds A), they must be inert towards NCO groups. If they are added only after the reaction of A) with B), this restriction does not apply. Reactive diluents are described exemplarily, by way of example, in P. K. T. Oldring (Ed.), Chemistry & Technology of UV & EB Formulations For Coatings, Inks & Paints, Vol. 2, 1991, SITA Technology, London, pp. 237-285. They may be esters of acrylic acid or methacrylic acid, preferably of acrylic acid, with mono-polyfunctional or alcohols. Examples of suitable alcohols include the isomeric butanols, pentanols, hexanols, heptanols, octanols, nonanols and decanols, and also cycloaliphatic alcohols such as isobornol, cyclohexanol and alkylated cyclohexanols, dicyclopentanol, arylaliphatic alcohols such as phenoxyethanol and nonylphenylethanol, and tetrahydrofurfuryl alcohols. Additionally it is possible to use alkoxylated derivatives of these alcohols. Suitable dihydric alcohols are, for example, alcohols such as ethylene glycol, propane-1,2-diol, propane-1,3-diol, diethylene glycol, dipropylene glycol, the isomeric butanediols, neopentyl glycol, hexane-1,6-diol, 2-ethylhexanediol and tripropylene glycol or else alkoxylated derivatives of these alcohols. Preferred dihydric alcohols are hexane-1,6-diol, dipropylene glycol and tripropylene glycol. Suitable trihydric alcohols are glycerol or trimethylolpropane or their alkoxylated derivatives. Tetrahydric alcohols are pentaerythritol or its alkoxylated derivatives.

The binders of the invention must be stabilized against premature polymerization. Therefore, as a constituent of component E), before and/or during the reaction of components A)-D), preferably phenolic stabilizers are added which inhibit the polymerization. Use is made in this context of phenols such as para-methoxyphenyl, 2,5-di-tert-butylhydroquinone or 2,6-di-tert-butyl-4-methyl-phenol. Also suitable are N-oxyl compounds for stabilization, such as 2,2,6,6-tetramethylpiperidine N-oxide (TEMPO), for example, or its derivatives. The stabilizers can also be incorporated chemically into the binder; suitability in this context is possessed by compounds of the abovementioned classes, especially if they still carry further free aliphatic alcohol groups or primary or secondary amine groups and hence can be attached chemically to compounds of component A) by way of urethane or urea groups. Particularly suitable for this purpose are 2,2,6,6-tetramethyl-4-hydroxypiperidine N-oxide. Preference is given to phenolic stabilizers, especially para-methoxyphenol and/or 2,6-di-tert-butyl-4-methylphenol.

Other stabilizers, such as compounds from the class of the HALS (HALS=hindered amine light stabilizers), in contrast, are used less preferably in E), since they are known not to enable such effective stabilization and instead may lead to "creeping" free-radical polymerization of unsaturated groups.

In order to stabilize the reaction mixture, in particular the unsaturated groups, against premature polymerization it is possible to pass an oxygen-containing gas, preferably air, into and/or over the reaction mixture. It is preferred for the gas to have a very low moisture content, in order to prevent unwanted reaction in the presence of free isocyanate groups.

In general a stabilizer is added during the preparation of the binders of the invention, and at the end, in order to achieve a long-term stability, stabilization is repeated with a phenolic stabilizer, and optionally the reaction product is saturated with air.

In the process of the invention the stabilizer component is used typically in amounts of 0.001-5.0% by weight, preferably 0.01-2.0% by weight and more preferably 0.05-1.0% by weight, based on the solids content of the process product.

The process of the invention is carried out in an order such that first A) is carried out with B) until the NCO groups have been fully converted. The intermediate formed can optionally be stored and/or transported. This is then followed by reaction of the uretdione groups with component C).

The ratio of NCO groups in A) and NCO-reactive groups in B) is from 1:1 to 1:1.5, preferably from 1:1 to 1:1.2, in particular 1:1. The ratio of uretdione groups in A) to hydroxyl groups in C) is from 1:0.4 to 1:6, preferably from 1:0.9 to 1:4, in particular from 1:0.9 to 1:2. Additionally it is essential that the sum of the NCO groups and uretdione groups in A) exceeds that of the NCO-reactive and uretdione-group-reactive groups in B).

Depending on the chosen proportions of the components A)-C) process products are obtained which are either free from isocyanate-reactive groups such as OH groups or still contain such groups.

The process of the invention is preferably carried out at temperatures of 20 to 100° C., more preferably of 40 to 90° C. In particular the reaction of the uretdione groups with the hydroxyl groups is carried out at 60 to 90° C.

The viscosity of the binders obtainable in accordance with the invention depends in particular on functionality, molecular weight and chemical identity of the component C) used and also on the stoichiometric proportions used. Where, for example, the preferred monomeric diols or triols are used, and also polylactones and/or polyethers derived therefrom with an average molecular weight of below 1000 g/mol, the result is preferably binders with a viscosity at 23° C. of below 100 000 mPas, more preferably below 75 000 mPas, very preferably below 40 000 mPas. The number-average molecular weight is preferably from 500 to 5000, in particular 800 to 2000 g/mol.

It is immaterial whether the process of the invention is carried out continuously, in a static mixer for example, or batchwise, in a stirred reactor for example. Preferably the process of the invention is carried out in a stirred reactor, the sequence of the addition of components A) and B) in the first process step and that of the intermediate from A) and B) with C) in the second process step being arbitrary. The addition of the stabilizers present in E) takes place preferably before component B) is exposed to a thermal load. The other parts of component E) may be added at any desired point in time. The phenoxide compounds of D) are preferably not added until after the intermediate has been prepared from A) and B).

The course of the reaction can be monitored by means of measuring instruments installed in the reaction vessel and/or on the basis of analyses on samples taken.

Suitable techniques are known to the skilled person. They include, for example, viscosity measurements, measurements of the refractive index, of the OH content, gas chromatography (GC), nuclear magnetic resonance spectroscopy (NMR), infrared spectroscopy (IR) and near infrared spectroscopy (NIR). Preference is given to IR checking for any free NCO groups present (for aliphatic NCO groups, band at approximately $v=2272$ cm$^{-1}$) and, in particular, for uretdione groups (e.g. band for uretdiones based on hexamethylene diisocyanate at $v=1761$ cm$^{-1}$) and to GC analyses for unreacted compounds from B) and C). It is possible not to carry out the reaction of the uretdione groups with the hydroxyl groups completely, but instead to terminate on reaching a certain conversion. A further (creeping) reaction can be suppressed by adding acidic agents, such as are known, for example, to the skilled person for stabilizing isocyanate groups. Particular suitability is possessed by acids or acid derivatives, e.g. benzoyl chloride, phthaloyl chloride, phosphinous, phosphonous and/or phosphorous acid, phosphinic, phosphonic and/or phosphoric acid and also the acidic esters of the last-mentioned 6 acid types, sulphuric acid and its acidic esters and/or sulphonic acids.

The binders of the invention can be used for producing coatings and paints and also adhesives, printing inks, casting resins, dental compounds, sizes, photoresists, stereolithography systems, resins for composite materials and sealants. In the case of adhesive bonding or sealing, however, a requirement is that, in the case of UV radiation curing, at least one of the two substrates to be bonded or sealed to one another is permeable to UV radiation; in other words, in general, it must be transparent. In the case of electron beams, sufficient permeability for electrons should be ensured. Preference is given to use in paints and coatings.

The invention further provides coating compositions comprising one or more binders obtainable in accordance with the invention, optionally one or more polyisocyanates containing free or blocked isocyanate groups, which optionally contain groups which react, with polymerization, with ethylenically unsaturated compounds on exposure to actinic radiation, optionally other compounds, different from those of a), which contain groups which react, with polymerization, with ethylenically unsaturated compounds on exposure to actinic radiation, and optionally contain NCO-reactive groups, optionally one or more isocyanate-reactive compounds containing active hydrogen which are free from groups which react, with polymerization, with ethylenically unsaturated compounds on exposure to actinic radiation, initiators, optionally auxiliaries and additives.

Polyisocyanates b) are aromatic, araliphatic, aliphatic or cycloaliphatic di- or polyisocyanates. Mixtures of such diisocyanates or polyisocyanates can also be used. Examples of suitable diisocyanates or polyisocyanates are butylene diisocyanate, hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures thereof of any desired isomer content, isocyanatomethyl-1,8-octane diisocyanate, 1,4-cyclohexylene diisocyanate, the isomeric cyclohexanedimethylene diisocyanates, 1,4-phenylene diisocyanate, 2,4- and/or 2,6-tolylene diisocyanate, 1,5-naphthylene diisocyanate, 2,4'- or 4,4'-diphenylmethane diisocyanate, triphenylmethane-4,4',4"-triisocyanate or derivatives thereof with a urethane, urea, carbodiimide, acylurea, isocyanurate, allophanate, biuret, oxadiazinetrione, uretdione, iminooxadiazinedione structure and mixtures thereof. Preference is given to polyisocyanates based on oligomerized and/or derivatized diisocyanates which have been freed from excess diisocyanate by suitable methods, particularly those of hexamethylene diisocyanate, isophorone diisocyanate and of the isomeric bis(4,4'-isocyanatocyclohexyl)methanes and also mixtures thereof. Particular preference is given to the oligomeric isocyanurates and iminooxadiazinediones of HDI and mixtures thereof and also to the oligomeric isocyanurates of IPDI.

It is optionally also possible to use the aforementioned isocyanates blocked with compounds known to the skilled person from coatings technology. As an example of blocking agents mention may be made of the following: alcohols, lactams, oximes, malonates, alkyl acetoacetates, triazoles, phenols, imidazoles, pyrazoles and also amines, such as butanone oxime, diisopropylamine, 1,2,4-triazole, dimethyl-1,2,4-triazole, imidazole, diethyl malonate, ethyl acetoacetate, acetone oxime, 3,5-dimethylpyrazole, ε-caprolactam, N-tert-butyl-benzylamine, cyclopentanone carboxyethyl ester or any desired mixtures of these blocking agents.

The polyisocyanates b) may optionally contain one or more functional groups which react, with polymerization, with ethylenically unsaturated compounds on exposure to actinic radiation. These groups may be prepared by reacting the unsaturated and isocyanate-reactive compounds specified under B), including the ranges of preference, with saturated polyisocyanates by methods known per se. NCO-containing urethane acrylates of this kind are available commercially from Bayer AG, Leverkusen, DE as Roskydal® UA VP LS 2337, Roskydal® UA VP LS 2396 or Roskydal® UA XP 2510.

As compounds of component c) it is possible to use polymers such as polyacrylates, polyurethanes, polysiloxanes, polyesters, polycarbonates, polyethers containing groups which react, with polymerization, with ethylenically unsaturated compounds through exposure to actinic radiation. Such groups are α,β-unsaturated carboxylic acid derivatives such as acrylates, methacrylates, maleates, fumarates, maleimides, acrylamides, and also vinyl ethers, propenyl ethers, allyl ethers and compounds containing dicyclopentadienyl units. Preference is giving to acrylates and methacrylates. Examples include the reactive diluents known in the technology of radiation curing and described exemplarily under E) (cf. Römpp Lexikon Chemie, p. 491, 10th ed. 1998, Georg-Thieme-Verlag, Stuttgart) or the binders known in the technology of radiation curing, such as polyether acrylates, polyester acrylates, urethane acrylates, epoxy acrylates, melamine acrylates, silicone acrylates, polycarbonate acrylates and acrylated polyacrylates, which optionally contain isocyanate-reactive groups, hydroxyl groups in particular.

Suitable compounds d) are, for example, the hydroxyfunctional monomeric or polymeric compounds described under C), and also water, which is contacted with the remaining constituents only after coating, optionally in the form of atmospheric moisture. Additionally it is possible to use NH-functional compounds such as amine-terminated polyethers, polyamines and aspartates.

As initiators of component e) for a free-radical polymerization it is possible to employ initiators which can be activated thermally and/or by radiation. Photoinitiators, which are activated by UV or visible light, are preferred in this context. Photoinitiators are compounds known per se, being sold commercially, a distinction being made between unimolecular (type I) and bimolecular (type II) initiators. Suitable (type I) systems are aromatic ketone compounds, e.g. benzophenones in combination with tertiary amines, alkylbenzophenones, 4,4'-bis(dimethylamino)benzophenone (Michler's ketone), anthrone and halogenated benzophenones or mixtures of the types stated. Of further suitability are (type II) initiators such as benzoin and its derivatives, benzil ketals, acylphosphine oxides, 2,4,6-trimethylbenzoyldiphenylphosphine oxide for example, bisacylphosphine oxides, phenylglyoxylic esters, camphorquinone, α-aminoalkylphenones, α,α-dialkoxyacetophenones and α-hydroxyalkylphenones.

The initiators, which are used in amounts between 0.1% and 10% by weight, preferably 0.1% to 5% by weight, based on the weight of the film-forming binder, can be used as an individual substance or, on account of frequent advantageous synergistic effects, in combination with one another.

Where electron beams are used instead of UV irradiation there is no need for a photoinitiator. Electron beams, as is known to the skilled person, are generated by means of thermal emission and accelerated by way of a potential difference. The high-energy electrons then pass through a titanium foil and are guided onto the binders to be cured. The general principles of electron beam curing are described in detail in "Chemistry & Technology of UV & EB Formulations for Coatings, Inks & Paints", Vol. 1, P. K. T Oldring (Ed.), SITA Technology, London, England, pp. 101-157, 1991.

In the event of thermal curing of the activated double bonds, this can also take place with addition of thermally decomposing free-radical initiators. Suitability is possessed, as is known to the skilled person, by, for example, peroxy compounds such as dialkoxy dicarbonates such as, for example, bis(4-tert-butylcyclohexyl) peroxydicarbonate, dialkyl peroxides such as, for example, dilauryl peroxide, peresters of aromatic or aliphatic acids such as, for example, tert-butyl perbenzoate or tert-amyl peroxy 2-ethylhexanoate, inorganic peroxides such as, for example, ammonium peroxodisulphate, potassium peroxodisulphate, organic peroxides such as, for example, 2,2-bis(tert-butylperoxy)butane, dicumyl peroxide, tert-butyl hydroperoxide or else azo compounds such as 2,2'-azobis[N-(2-propenyl)-2-methylpropionamides], 1-[(cyano-1-methylethyl)azo]formamides, 2,2'-azobis(N-butyl-2-methylpropionamides), 2,2'-azobis(N-cyclohexyl-2-methyl-propionamides), 2,2'-azobis{2-methyl-N-[2-(1-hydroxybutyl)]propionamides}, 2,2'-azobis{2-methyl-N-[2-(1-hydroxybutyl)]propionamides, 2,2'-azobis{2-methyl-N-[1,1-bis(hydroxymethyl)-2-hydroxyethyl]propionamides. Also possible are highly substituted 1,2-diphenylethanes (benzpinacols), such as, for example, 3,4-dimethyl-3,4-diphenylhexane, 1,1,2,2-tetraphenylethane-1,2-diol or else the silylated derivatives thereof.

It is also possible to use a combination of initiators activable by UV light and thermally.

The auxiliaries and additives of component f) include solvents of the type specified above under E).

Additionally it is possible for f), in order to increase the weather stability of the cured coating film, to comprise UV absorbers and/or HALS stabilizers as well. Preference is given to the combination. The former ought to have an absorption range of not more than 390 nm, such as triphenyltriazine types (e.g. Tinuvin® 400 (Ciba Spezialitätenchemie GmbH, Lampertheim, DE)), benzotriazoles such as Tinuvin® 622 (Ciba Spezialitätenchemie GmbH, Lampertheim, DE) or oxalic dianilides (e.g. Sanduvor® 3206 (Clariant, Muttenz, C H))) and are added at 0.5% –3.5% by weight, based on resin solids. Suitable HALS stabilizers are available commercially (Tinuvin® 292 or Tinuvin® 123 (Ciba Spezialitätenchemie GmbH, Lampertheim, DE) or Sanduvor® 3258 (Clariant, Muttenz, CH). Preferred amounts are 0.5%-2.5% by weight based on resin solids.

It is likewise possible for f) to comprise pigments, dyes, fillers, levelling additives and devolatilizing additives.

Additionally it is possible, if necessary, for the catalysts known from polyurethane chemistry for accelerating the NCO/OH reaction to be present in f). These are, for example, tin salts or zinc salts or organotin compounds, tin soaps and/or zinc soaps such as, for example, tin octoate, dibutyltin dilaurate, dibutyltin oxide, tertiary amines such as diazabicyclo[2.2.2]octane (DABCO), for example, bismuth compounds, zirconium compounds or molybdenum compounds.

The application of the coating compositions of the invention to the material to be coated takes place with the methods known and customary in coatings technology, such as spraying, knife coating, rolling, pouring, dipping, spin coating, brushing or squirting or by means of printing techniques such as screen, gravure, flexographic or offset printing and also by means of transfer methods.

Suitable substrates are, for example, wood, metal, including in particular metal as used in the applications of wire enamelling, coil coating, can coating or container coating, and also plastic, including plastic in the form of films, especially ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM, and UP (abbreviations according to DIN 7728T1), paper, leather, textiles, felt, glass, wood, wood materials, cork, inorganically bonded substrates such as wooden boards and fibre cement slabs, electronic assemblies or mineral substrates. It is also possible to coat substrates consisting of a variety of the abovementioned materials, or to coat already coated substrates such as vehicles, aircraft or boats and also parts thereof, especially vehicle bodies or parts for exterior mounting. It is also possible to apply the coating compositions to a substrate temporarily, then to cure them partly or fully and optionally to detach them again, in order to produce films, for example. For curing it is possible for solvents present, for example, to be removed entirely or partly by flashing off.

Subsequently or simultaneously it is possible for the optionally necessary thermal and the photochemical curing operation or operations to be carried out in succession or simultaneously.

If necessary the thermal curing can take place at room temperature or else at elevated temperature, preferably at 40-106° C., preferably at 60-130° C., more preferably at 80-110° C.

Where photoinitiators are used in e) the radiation cure takes place preferably by exposure to high-energy radiation, in other words UV radiation or daylight, such as light of wavelength 200 to 700 nm or by bombardment with high-energy electrons (electron beams, 150 to 300 keV). Radiation sources of light or UV light used are, for example, high-pressure or medium-pressure mercury vapour lamps, it being possible for the mercury vapour to have been modified by doping with other elements such as gallium or iron. Lasers, pulsed lamps (known under the designation of UV flashlight lamps), halogen lamps or excimer emitters are likewise possible. As an inherent part of their design or through the use of special filters and/or reflectors, the emitters may be equipped so that part of the UV spectrum is prevented from being emitted. By way of example, for reasons of occupational hygiene, for example, the radiation assigned to UV-C or to UV-C and UV-B may be filtered out. The emitters may be installed in stationary fashion, so that the material for irradiation is conveyed past the radiation source by means of a mechanical device, or the emitters may be mobile and the material for irradiation may remain stationary in the course of curing. The radiation dose which is normally sufficient for crosslinking in the case of UV curing is situated in the range from 80 to 5000 mJ/cm$^2$.

Irradiation can if desired also be carried out in the absence of oxygen, such as under an inert gas atmosphere or an oxygen-reduced atmosphere. Suitable inert gases are preferably nitrogen, carbon dioxide, noble gases or combustion gases. Irradiation may additionally take place by covering the coating with media transparent to the radiation. Examples of such are, for example, polymeric films, glass or liquids such as water.

Depending on the radiation dose and curing conditions it is possible to vary the type and concentration of any initiator used, in a manner known to the skilled person.

Particular preference is given to carrying out curing using high-pressure mercury lamps in stationary installations. Photoinitiators are then employed at concentrations of from 0.1% to 10% by weight, more preferably from 0.2% to 3.0% by weight, based on the solids of the coating. For curing these coatings it is preferred to use a dose of from 200 to 3000 mJ/cm$^2$, measured in the wavelength range from 200 to 600 nm.

In the case of use of thermally activable initiators in e) by increasing the temperature. The thermal energy may be introduced into the coating by means of radiation, thermal conduction and/or convection, it being customary to employ the ovens, near-infrared lamps and/or infrared lamps that are conventional in coatings technology.

The applied film thicknesses (prior to curing) are typically between 0.5 and 5000 μm, preferably between 5 and 1000 μm, more preferably between 15 and 200 μm. Where solvents are used, it is removed after application and before curing, by the customary methods.

EXAMPLES

All percentages are by weight unless indicated otherwise.

The determination of the NCO contents in % was undertaken by back-titration with 0.1 mol/l hydrochloric acid following reaction with butylamine, on the basis of DIN EN ISO 11909.

The viscosity measurements were carried out with a cone-plate viscosimeter (SM-KP), Viskolab LC3/ISO from Paar Physica, Ostfildern, DE in accordance with ISO/DIS 3219:1990.

Infrared spectroscopy was on liquid films applied between sodium chloride plates on a model 157 instrument from Perkin Elmer, Überlingen, DE.

The amount of residue monomers and amount of volatile synthesis components were analyzed by means of GC (method using tetradecane as internal standard, oven temperature 110° C., injector temperature 150° C., carrier gas helium, instrument: 6890 N, Agilent, Waldbronn, DE, column: Restek RT 50, 30 m, 32 mm internal diameter, film thickness 0.25 μm).

The solids was determined in accordance with DIN 53216/1 draft 4/89, ISO 3251 The ambient temperature of 23° C. prevailing at the time when the experiments were conducted is referred to as RT.

Desmodur® N 3400: HDI polyisocyanate predominantly containing uretdione structure, viscosity 185 mPas/23° C., NCO content 21.4%, commercial product of Bayer AG, Leverkusen, DE.

Desmorapid® Z: dibutyltin dilaurate (DBTL), commercial product of Bayer AG, Leverkusen, DE.

Darocur® 1173: photoinitiator, commercial product of Ciba Spezialitätenchemie GmbH, Lampertheim, DE.

Desmophen® 850: linear, hydroxyl-containing polyester, solvent-free, hydroxyl content 8.5%, equivalent weight 200 g/Eq, viscosity (in dilution with methoxypropyl acetate to 75% solids content) 850 mPa s at 23° C.

Example 1 describes the preparation of a suitable catalytically active phenoxide, which was used in inventive Examples 2-6.

Example 1

Tetrabutylammonium Salicylate

A glass flask with reflux condenser, heatable oil bath, mechanical stirrer and internal thermometer was charged at room temperature with 35.90 g of ethyl salicylate and 282.13 g of water and these components were stirred together thoroughly. Subsequently 139.98 g of tetrabutylammonium hydroxide (40% strength in water) were added and the reaction mixture was heated to 60° C. It was stirred at 60° C. for one hour (the contents of the flask become clear). Then the reaction mixture was cooled and the water was distilled off under reduced pressure, 20 mbar, at 30-45° C. The residue was taken up at 60° C. in 200 ml of toluene. Subsequently the mixture was redistilled. The residue was recrystallized from 50 ml of butyl acetate. The product was filtered off, washed with butyl acetate and dried at 80° C. and 10 mbar in a vacuum drying cabinet. This gave a white solid having a melting point of 93° C.

Example 2

Inventive Allophanate-Containing Binder

A three-necked flask with reflux condenser, stirrer and dropping funnel, and through which air was passed (6 l/h), was charged at RT with 47.02 g of Desmodur® N3400, 0.10 g of 2,6-di-tert-butyl-4-methylphenol and 0.001 g of Desmorapid® Z and this initial charge was then heated to 60° C. 28.00 g of 2-hydroxyethyl acrylate was slowly added dropwise, in the course of which a maximum temperature of 70° C. was attained. Thereafter the reaction mixture was held at 70° C. until the NCO content <0.1%. Subsequently 20.00 g of butyl acetate and 4.42 g of trimethylolpropane were added and dissolved in the reaction mixture. 0.41 g of the catalyst according to Example 1 was added. The reaction mixture was heated and held at 80° C. until the IR spectrum at v=1768 cm$^{-1}$ after 5.5 h only a very weak signal for uretdione groups was detectable. The product obtained was clear and had a viscosity of 8700 mPas/23° C. with a solids content of 81.8% and an NCO content of 0%.

Examples 3-6 were conducted in analogy to Example 2. The amounts used, in [g], were those listed in the table below.

| | Example | | | | |
|---|---|---|---|---|---|
| | 2 | 3 | 4 | 5 | 6 |
| Desmodur ® N3400 | 47.02 | 45.93 | 43.89 | 41.78 | 20.12 |
| 2-hydroxyethyl acrylate | 28.00 | 27.35 | 26.14 | 24.88 | 11.45 |
| Butyl acetate | 20.00 | 20.00 | 20.00 | 20.00 | 20.92 |
| Trimethylolpropane | 4.42 | 6.16 | — | — | — |
| Ethoxylated trimethylolpropane* | — | — | 9.42 | 12.79 | — |
| Desmophen ® 850 | — | — | — | — | 51.10 |
| Catalyst of Ex. 1 | 0.41 | 0.41 | 0.41 | 0.41 | 0.76 |
| Reaction time after addition of catalyst of Ex. 1 | 5.5 h | 2.0 h | 13.0 h | 4.0 h | 15.0 h |
| Solids content | 81.8 | 81.1 | 81.3 | 80.6 | 81.9 |
| Viscosity at 23° C. | 8700 | 4180 | 5350 | 2250 | 2350 |

*polyether prepared starting from trimethylolpropane, with on average 4-fold ethoxylation (hydroxyl number 550, dynamic viscosity 505 mPa · s at 23° C.)

Comparative Example 1 and 2

Attempt at Preparing an Allophanate-Containing Binder

The catalysts described in U.S. Pat. No. 2003 301 537 13 for the crosslinking of powder coating materials comprising curatives containing uretdione groups and polymeric hydroxyl compounds without activated double bonds were investigated for suitability:

Comparative Example C1

Example 2 was repeated but in this case replacing the catalyst of Example 0 by the equal molar amount of tetrabutylammonium hydroxide.

Comparative Example C2

Example 2 was repeated but in this case replacing the catalyst of Example 1 by the equal molar amount of tetrabutylammonium fluoride.

|   | Example | | |
|---|---|---|---|
|   | 2 | C1 | C2 |
| Reaction time following addition of the catalyst | 5.5 h | 2.5 h | 2.0 h |
| Visual assessment | Clear | severe clouding | severe clouding |
| Solids content [%] | 81.8 | 81.7 | 82.2 |
| Viscosity [mPa s] at 23° C. | 8700 | 12000 | 16000 |

The comparison shows that the products according to Comparative Example C1 and C2 have higher viscosities and owing to the marked clouding which occurs cannot be used as coating compositions.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing binders comprising reacting
  A) one or more NCO-functional compounds containing uretdione groups first with
  B) one or more compounds which contain groups capable of participating in polymerization reaction with ethylenically unsaturated compounds on exposure to actinic radiation, and contain isocyanate-reactive groups, followed by
  C) reaction with one or more hydroxyl-containing compounds other than B), wherein at least one of these compounds has an OH functionality of $\geq 2$,
  D) in the presence of one or more compounds containing phenoxide groups, as catalysts, and
  E) optionally auxiliaries and additives,
  wherein the reaction with compounds of component C) proceeds at least proportionally with the formation of allophanate groups and wherein the binder contains allophanate groups and groups capable of participating in a polymerization reaction with ethylenically unsaturated compounds on exposure to actinic radiation, and optionally also contain NCO-reactive groups.

2. The process for preparing binders containing allophanate groups according to claim 1, wherein the compounds of component A) containing uretdione groups are based on hexamethylene diisocyanate.

3. The process for preparing binders containing allophanate groups according to claim 2, wherein component B) comprises 2-hydroxyethyl acrylate, 2-hydroxypropyl acrylate, 4-hydroxybutyl acrylate, polyethylene oxide mono(meth)acrylate, polypropylene oxide mono(meth)acrylate and/or the reaction products of acrylic acid with glycidyl methacrylate.

4. The process for preparing binders containing allophanate groups according to claim 2, wherein component C) comprises one or more compounds selected from the group consisting of monomeric diols and triols, polyethers derived therefrom and polylactones with an average molecular weight $M_n<1000$ g/mol.

5. The process for preparing binders containing allophanate groups according to claim 2, wherein component D) comprises as a catalyst tetrabutylammonium 4-(methoxycarbonyl)phenoxide, tetrabutylammonium 2-(methoxycarbonyl)phenoxide, tetrabutylammonium 4-formylphenoxide, tetrabutylammonium 4-nitrilephenoxide, tetrabutylphosphonium 4-(methoxycarbonyl)phenoxide, tetrabutylphosphonium 2-(methoxy-carbonyl)phenoxide, tetrabutylphosphonium 4-formylphenoxide, tetrabutylammonium salicylate and/or tetrabutylphosphonium salicylate.

6. The process for preparing binders containing allophanate groups according to claim 2, wherein the process temperatures are from 20 to 100° C.

7. The process for preparing binders containing allophanate groups according to claim 1, wherein component B) comprises 2-hydroxyethyl acrylate, 2-hydroxypropyl acrylate, 4-hydroxybutyl acrylate, polyethylene oxide mono(meth)acrylate, polypropylene oxide mono(meth)acrylate and/or the reaction products of acrylic acid with glycidyl methacrylate.

8. The process for preparing binders containing allophanate groups according to claim 7, wherein component C) comprises one or more compounds selected from the group consisting of monomeric diols and triols, polyethers derived therefrom and polylactones with an average molecular weight $M_n<1000$ g/mol.

9. The process for preparing binders containing allophanate groups according to claim 7, wherein component D) comprises as a catalyst tetrabutylammonium 4-(methoxycarbonyl)phenoxide, tetrabutylammonium 2-(methoxycarbonyl)phenoxide, tetrabutylammonium 4-formylphenoxide, tetrabutylammonium 4-nitrilephenoxide, tetrabutylphosphonium 4-(methoxycarbonyl)phenoxide, tetrabutylphosphonium 2-(methoxycarbonyl)phenoxide, tetrabutylphosphonium 4-formylphenoxide, tetrabutylammonium salicylate and/or tetrabutylphosphonium salicylate.

10. The process for preparing binders containing allophanate groups according to claim 7, wherein the process temperatures are from 20 to 100° C.

11. The process for preparing binders containing allophanate groups according to claim 1, wherein component C) comprises one or more compounds selected from the group consisting of monomeric diols and triols, polyethers derived therefrom and polylactones with an average molecular weight $M_n<1000$ g/mol.

12. The process for preparing binders containing allophanate groups according to claim 1, wherein component D) comprises as a catalyst tetrabutylammonium 4-(methoxycarbonyl)phenoxide, tetrabutylammonium 2-(methoxycarbonyl)phenoxide, tetrabutylammonium 4-formylphenoxide, tetrabutylammonium 4-nitrilephenoxide, tetrabutylphosphonium 4-(methoxycarbonyl)phenoxide, tetrabutylphosphonium 2-(methoxycarbonyl)phenoxide, tetrabutylphosphonium 4-formylphenoxide, tetrabutylammonium salicylate and/or tetrabutylphosphonium salicylate.

13. The process for preparing binders containing allophanate groups according to claim 1, wherein the process temperatures are from 20 to 100° C.

* * * * *

UNITED STATES PATENT AND TRADEMARK OFFICE
CERTIFICATE OF CORRECTION

PATENT NO. : 7,381,785 B2
APPLICATION NO. : 11/080176
DATED : June 3, 2008
INVENTOR(S) : Christophe Dètrembleur et al.

It is certified that error appears in the above-identified patent and that said Letters Patent is hereby corrected as shown below:

On the title page, item 73 Assignee,
replace "Bayer MeterialScience AG"
with --Bayer MaterialScience AG--.

Signed and Sealed this

Eleventh Day of November, 2008

JON W. DUDAS
*Director of the United States Patent and Trademark Office*